Aug. 26, 1952     L. E. BARTLING     2,608,327
SPRAYER
Filed April 27, 1950     3 Sheets-Sheet 1
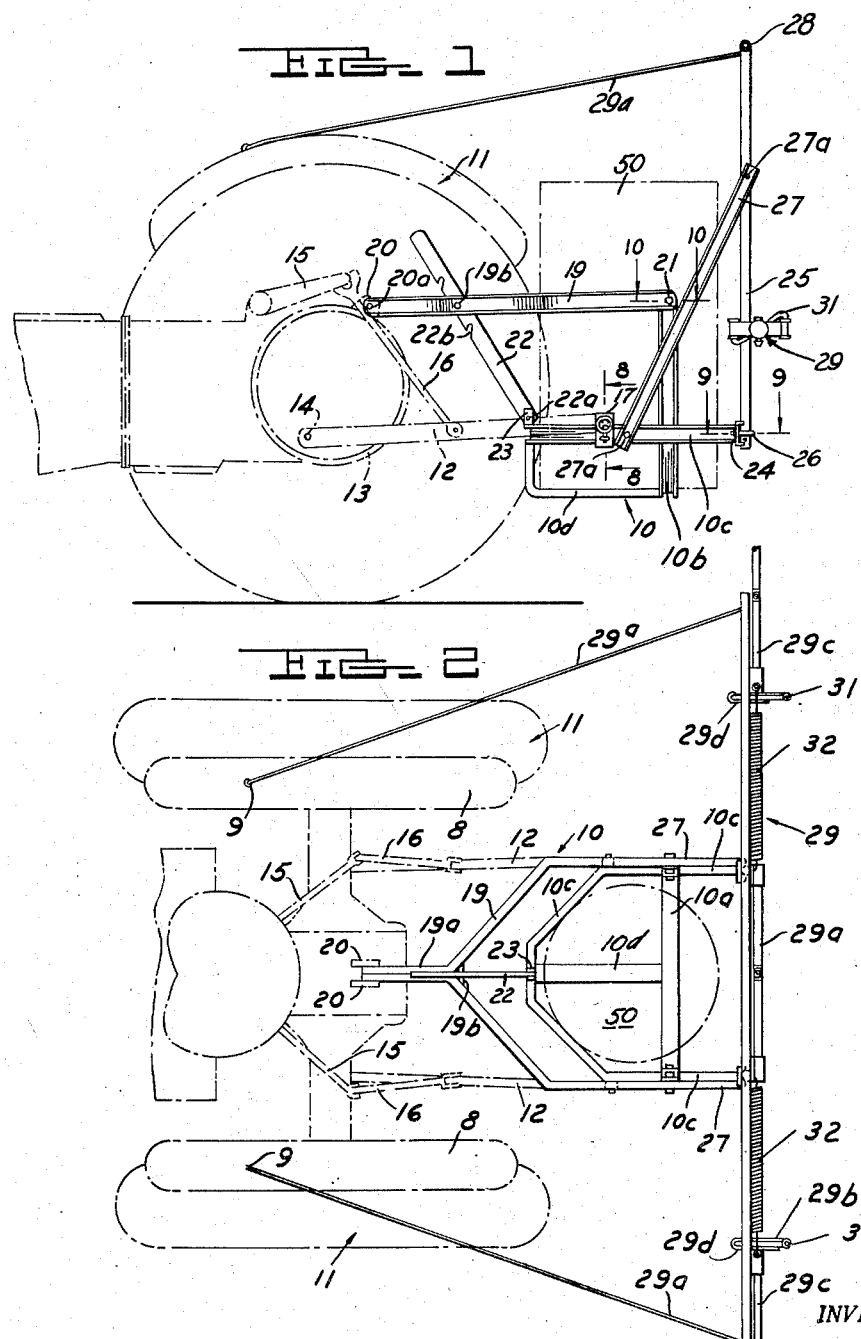
INVENTOR.
BY Loren E. Bartling
ATTORNEY Aug. 26, 1952 L. E. BARTLING 2,608,327
SPRAYER
Filed April 27, 1950 3 Sheets-Sheet 2
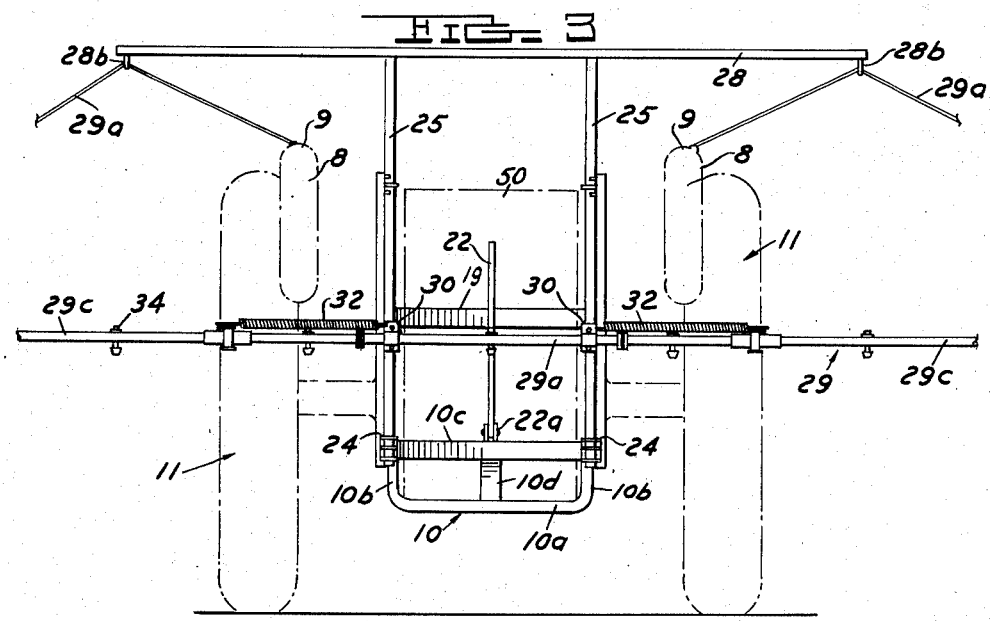
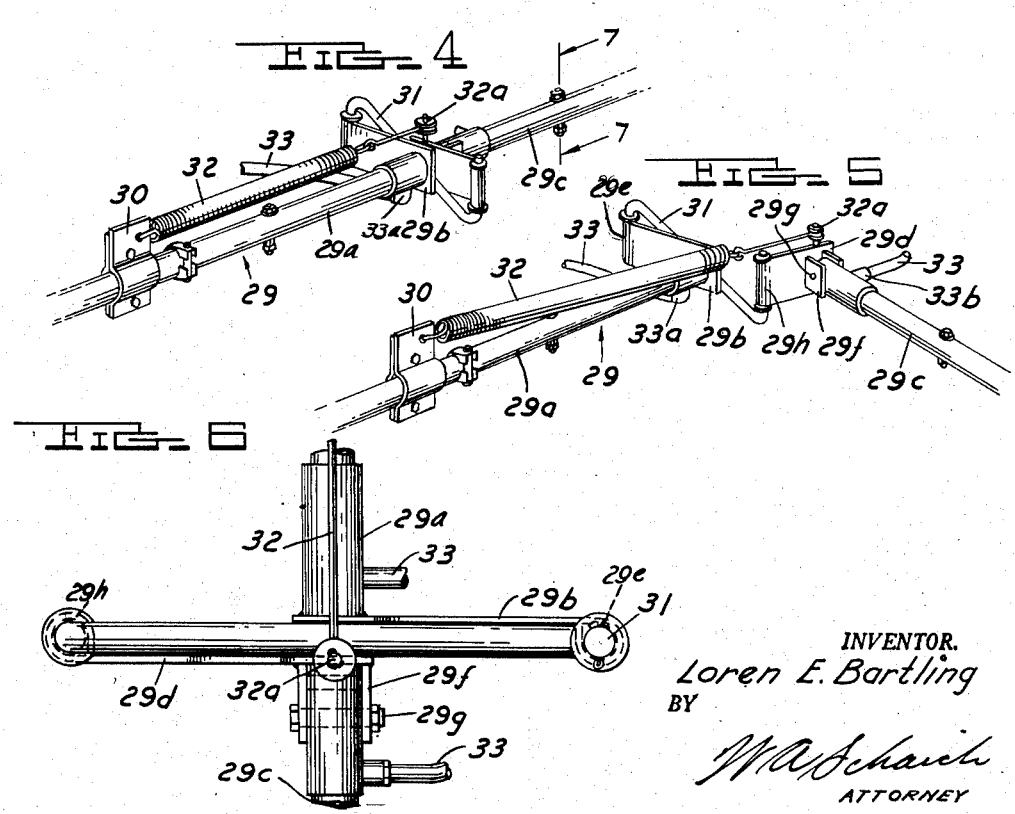
INVENTOR.
Loren E. Bartling
BY
ATTORNEY

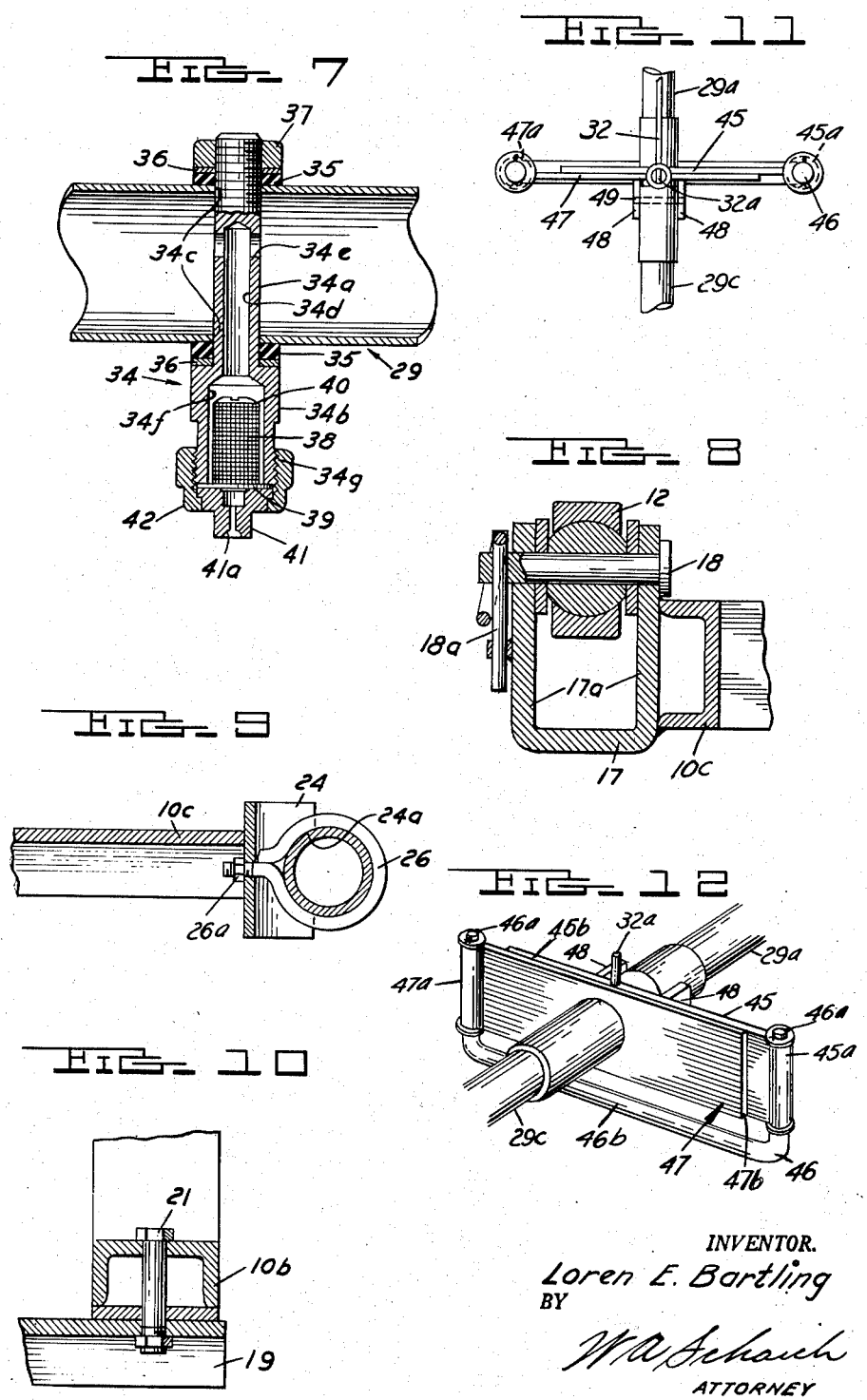

Patented Aug. 26, 1952

2,608,327

UNITED STATES PATENT OFFICE 2,608,327

SPRAYER

Loren E. Bartling, Detroit, Mich., assignor to Dearborn Motors Corporation, Highland Park, Mich., a corporation of Delaware Application April 27, 1950, Serial No. 158,551

4 Claims. (Cl. 224—42.44)

This invention relates to a tractor mounted sprayer.

An object of this invention is to provide a sprayer unit having a simplified frame construction for mounting on a tractor having a pair of vertically swingable, power-lifted draft links.

Another object of this invention is to provide a sprayer unit having a hinged boom for ease in passing through restricted openings with the tractor and the mounted sprayer unit.

A particular object of this invention is to provide a double hinged boom construction for a sprayer spring biased to the extended boom position which will minimize the possibility of damage to the boom under all operating conditions.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of the sprayer unit shown attached to the tractor.

Figure 2 is a plan view of Figure 1.

Figure 3 is a rear elevational view of Figure 1.

Figure 4 is an enlarged detailed view of the hinge joint showing the boom in the extended position.

Figure 5 is a view similar to Figure 4 but showing the boom in a partially collapsed position.

Figure 6 is an enlarged fragmentary detail plan view of the hinge joint.

Figure 7 is a cross sectional view taken along the plane 7—7 of Figure 4.

Figure 8 is an enlarged cross sectional view taken along the plane 8—8 of Figure 1.

Figure 9 is an enlarged cross sectional detail view taken along the plane 9—9 of Figure 1.

Figure 10 is an enlarged detail cross sectional view taken along the plane 10—10 of Figure 1.

Figure 11 is a detail plan view of a modified hinge construction.

Figure 12 is a detail perspective view of the modified hinge shown in Figure 11.

As shown on the drawings:

Briefly, the improved sprayer of this invention is readily mounted on the trailing draft links of a tractor of well-known make for ease and convenience in transporting the sprayer during operation. Such sprayer includes a frame for supporting a tank for containing spray liquid and such frame is mountable on the trailing draft links of the tractor. A spray boom is also mounted on the frame rearwardly of the spray tank and transversely of the tractor. The boom is collapsible to permit passage of the tractor with the mounted sprayer through narrow openings such as gates when traveling to and from the working area, and an improved double acting hinge, spring biased to maintain the boom in extended position, permits the boom to fold in either direction when an obstruction is encountered.

The sprayer frame 10 of this improved sprayer for transporting the spray tank and boom is best illustrated in Figs. 1 to 3. Frame 10 comprises a U-shaped base member 10a having vertically upwardly extending side arms 10b. Intermediate the ends of the arms 10b there is secured to such arms as by welding a substantially U-shaped member 10c disposed horizontally and with the bight portion thereof extending forwardly. The arms of the U-shaped member 10c project rearwardly somewhat beyond the vertically disposed frame member 10a for a purpose to later appear. The two U-shaped members thus define a supporting pocket for a spray container or drum 50. If desired, an L-shaped bottom member 10d may be secured centrally of the bight portion of U-shaped frame member 10a and to the underside of the bight portion of frame member 10c as shown in Figs. 1 and 2.

The frame 10 is preferably utilized with a tractor of well-known make having a pair of transversely disposed draft links 12 pivoted to the rear axle housing 13 as at 14. Draft links 12 are power-lifted by a pair of transversely spaced lifting arms 15 operated by a hydraulic ram (not shown) built into the tractor. Lifting arms 15 are connected to draft links 12 by connecting rods 16.

Draft links 12 are pivotally connected to frame 10 in the following manner. A U-shaped bracket 17 (Figs. 1 and 8) is welded in a vertical position to the horizontal arms of the U-shaped member 10c intermediate the ends thereof. Draft links 12 are then pivotally secured between the upright side portions 17a of U-shaped bracket 17 by a transverse pin 18. Pin 18 is removably secured to bracket 17 by a linch pin 18a.

A Y-shaped arm or yoke 19 (Figs. 1 and 2) is provided to attach the top ends of frame member 10a to a central hitch point defined by a pair of lugs 20 provided on top of tractor axle housing 13. Each tine of the Y-shaped member 19 is respectively connected to the upper end of the arms 10b of frame member 10a by a bolt 21. The stem portion 19a of Y-shaped arm 19 is pivotally connected between upstanding tractor lugs 20 by a transverse mounting pin 20a. The forward end or bight portion of horizontally disposed U-shaped frame member 10c is connected to the Y-shaped arm 19 by a link 22. Link 22 is pivotally connected between a pair of upstanding lugs 23 on horizontal frame member 10c by a transverse pin 22a. A plurality of notches 22b are provided along the top end of link 22 which selectively cooperate with a pin 19b transversely supported by Y-shaped arm 19 just rearwardly of the stem portion 19a.

Each of the notches 22b has its side walls sloped in a generally vertical direction so that any one of said notches will readily disengage from pin 19b when the tractor draft links 12 are raised, but will remain in engagement with the pin 19b to prevent any lowering movements by the tractor draft links. Thus the links 22 serve to lock such frame at any selected vertical position which the hitch links may be raised to by the operator by selection of one of the notches 22b for engagement with pin 19b. When the hitch links are raised to any selected position, the adjusting link 22 prevents any lowering of the hitch links and frame 10, thus making the load carried by the hitch links independent of the operation of the tractor hydraulic system.

On each rearwardly projecting end of the arms of the U-shaped frame member 10c there is welded a channel shaped bracket member 24 (Figs. 1 and 3). Vertically aligned, substantially semicircular notches 24a are provided in the flanges of each bracket 24 as shown in Fig. 9 to receive a vertically disposed pipe-like post 25. Each post 25 is secured to the channel shaped member 24 within notches 24a by an eye bolt 26, secured in turn to the web portion of channel shape member 24 by a nut 26a. Each post 25 is supported in a vertical position by a channel shaped brace member 27 secured respectively at its upper and lower ends by bolts 27a to post 25 and U-shaped frame 10c. Posts 25 are maintained in transversely spaced relationship by a tubular beam 28 welded to the tops of posts 25. Beam 28 projects sideways beyond each post 25 in cantilever relationship for a purpose to presently appear. As previously indicated, liquid container or drum 50 may be conveniently carried by frame 10, resting on the bight portion of base member 10a and L-shaped bottom member 10d and laterally surrounded by U-shaped member 10c and yoke member 19.

A spray boom 29 is horizontally mounted on post 25 as shown in Figs. 1, 2 and 3. Boom 29 comprises a central portion 29a consisting of a tubular conduit which is mounted transversely of posts 25 and is respectively secured to each post by a clamping member 30. The center portion 29a of boom 29 projects beyond each upright support post 25 to approximately the same width as the rear tractor wheels. Each end of the center section 29a is sealed off by an end plate 29b welded thereto. Each end plate 29b is disposed longitudinally and serves as a mounting bracket for one end of a Z-shaped hinge bar 31. One end of a Z-shaped hinge bar 31 is pivotally mounted in a bent around end portion 29e on the forwardly disposed end of plate 29b.

A second end plate 29d having one end bent around as indicated at 29h for pivotal mounting on the other end of each hinge bar 31 is provided to support boom extensions 29c. Hinge bar 31 lies between end plates 29b and 29d when boom extension 29c is extended as shown in Fig. 4. A pair of transversely spaced lugs 29f are welded to each of the end plates 29d and the inner end of boom extensions 29c are respectively pivotally mounted between lugs 29f by a transverse bolt 29g (Figs. 5 and 6). Thus the boom extension 29c may be pivoted forwardly or rearwardly about hinge bar 31 for folding such boom extensions against the center portion 21a and such extension may also be raised vertically about bolt 29g.

A tension spring 32, one end of which is secured to clamp member 30 and the other end mounted on a vertical pin 32a welded to end plate 29d, yieldingly secures boom extension 29c in an extended position as best shown in Figs. 2 and 4. Spring 32 likewise yieldingly retains boom extensions 29c in either folded position, due to the off center location of the pin 32a when the boom extensions are in either folded position.

In Figs. 11 and 12 there is shown a modified hinge construction which permits the end plates to abut one another. In such figures an end plate 45 is welded to the end of center portion 29a of boom 29 to seal off the fluid contained in such portion. End plate 45 has one end 45a bent around to define a vertical axis bore to receive one arm of a U-shaped hinge bar 46. The other end 45b of end plate 45 projects substantially beyond the opposite side of center portion 29a as shown in Figure 11. Boom extension 29c is pivotally mounted to a second end plate 47 as shown in Figures 11 and 12. End plate 47 is substantially identical to end plate 45 having one end 47a bent around to receive the other arm of U-shaped hinge bar 46. A pair of transversely spaced lugs 48 are welded to end plate 47 opposite center portion 29a as shown in Figs. 11 and 12. Boom extension 29c is pivotally secured for vertical movement between the lugs 48 by a transverse bolt 49. The other end 47b of end plate 47 projects substantially beyond boom extension 29c.

U-shaped hinge bar 46 has its bight portion 46b underlying the end plates 45 and 47 and the arms of such hinge bar are respectively, rotatably secured at their ends to the end plates 45 and 47 by transverse pins 46a insertable through a suitable hole provided in the ends of such arms as best shown in Fig. 12. The same tension spring 32 is utilized to yieldingly maintain the boom extensions in either a folded or extended position in the same manner as described for the Z-bar hinge. In the modified hinge construction it will be noted that the end plates 45 and 47 are in intimate contact or abutting relationship as shown in Figs. 11 and 12. This construction provides a more rigid and sturdier arrangement when the boom extension 29c is in the fully extended position.

The inner and outer ends of boom extensions 29c are suitably sealed to prevent the escape of spray fluid therefrom. Boom extensions 29c are supplied with spray fluid from center portion 29a (Figs. 4, 5 and 6) by a flexible conduit 33 suitably connected to center portion 29a at 33a and to boom extension 29c at 33b. Pressured fluid is supplied to the center boom section 29a from drum 50 by any suitable pump (not shown) driven by the tractor power-take-off.

Boom extensions 29c are each additionally supported in substantially horizontal relationship by cables 29a, such cables being suitably connected at one end to the ends of boom extensions 29c threading through a depending eye 28b provided on each end of beam 28 and fastened to the tractor fenders 8 as shown at 9 (Fig. 3). The operator of the tractor may then conveniently raise the boom extension ends vertically without leaving the tractor seat by merely pulling the cable 28a. Thus obstructions in the path of the boom extensions such as stumps may be readily cleared. Obviously, cables 28a will not interfere with hinging movements of boom extensions 29c about hinge bars 31.

A plurality of nozzles 34 are secured to boom 29 in spaced relationship for discharging the spray fluid from such boom onto the rows of vegetation. The nozzles 34 are laterally spaced apart at the desired spacing to accommodate the rows to be sprayed. While nozzles 34 may be of any well known type, they preferably are constructed similar to the nozzle described and claimed in my copending application Serial No. 147,070, filed March 1, 1950. Nozzles 34 comprise a bolt-like member 34a having a cylindrical head portion 34b. The shank portion 34a of nozzle 34 is insertable in boom 29 through a pair of diametrically opposed holes 34c. The cylindrical head portion 34b is separated from boom 29 by a rubber washer 35. The end of bolt 34 projecting through boom 29 is surrounded by a similar rubber washer 35 and a metal washer 36 is placed on top of such rubber washer. A nut 37 screwed on to the end of bolt portion 34a draws head portion 34b tightly against such washer so that both washers 35 seal nozzle 34 tightly against boom 29 to eliminate the possibility of leakage around holes 34c. An axial bore 34d is provided in the nozzle 34 and such bore is connected by a transverse hole 34E within boom 29 to permit passage of the spray fluid from the boom 29 to axial bore 34d. The lower end of bore 34d is counterbored as shown at 34f and a metal gauze strainer or filter 38 secured to a washer 39 by a screw 40, is placed within such counterbore with washer 39 abutting the lowermost end of cylindrical head portion 34b. A nozzle 41 having a bore 41a of suitable configuration for producing a fine spray, is placed adjacent washer 39 underneath thereof and a cap 42 screwed onto the threaded end 34g of head portion 34 secures strainer 38 and nozzle 41 to head portion 34b.

From the above description it is apparent that there is here provided a sprayer unit which is easily and conveniently mounted on a tractor having the well-known three point hitch linkage, thereby facilitating mounting and transporting of such unit. The spray boom is readily foldable to permit passage of the tractor and mounted spray unit through relatively narrow openings without the necessity of disassembly or dismounting of the spray boom. The double acting hinge and vertical movement of the boom extensions assures protection of the boom extensions from damage. The improved spray rig of this invention is simple and hence can be economically constructed.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of laterally spaced, power-lifted, trailing hitch links and a top central hitch point, a spray rig comprising a vertically disposed first U-shaped frame, a horizontally disposed second U-shaped frame having medial portions of its arms respectively rigidly secured to medial portions of the arms of said first U-shaped frame, an angular strap having its ends secured respectively to the bight portions of said frames, thereby defining a supporting pocket for a fluid container, means for respectively pivotally connecting the arms of said second U-shaped frame to the trailing hitch links, and a yoke pivotally connecting the ends of the arms of said first U-shaped frame to the top central hitch point of the tractor, thereby maintaining a supported container substantially level as said hitch links are raised.

2. For use with a tractor having a pair of laterally spaced, power-lifted, trailing hitch links and a top central hitch point, a spray rig comprising a vertically disposed first U-shaped frame, a horizontally disposed second U-shaped frame having medial portions of its arms respectively rigidly secured to medial portions of the arms of said first U-shaped frame, thereby defining a supporting pocket for a fluid container, means for respectively pivotally connecting the arms of said second U-shaped frame to the trailing hitch links, an arm pivotally connecting said first U-shaped frame to the top central hitch point of the tractor, and an adjusting link having one end connected to said second U-shaped frame, and a plurality of means along its length for selectively connecting to said arm, thereby permitting selection of the angular position of said support pocket relative to the tractor.

3. For use with a tractor having a pair of laterally spaced, power-lifted, trailing hitch links and a top central hitch point, a spray rig comprising a first U-shaped frame disposed with its arms projecting horizontally rearwardly relative to the tractor, a second U-shaped frame having its arms vertically disposed and respectively rigidly secured to the arms of said first U-shaped frame, thereby defining a supporting pocket for a fluid container, means for respectively pivotally connecting the arms of said second U-shaped frame to the trailing hitch links, a yoke for connecting the arms of said first U-shaped frame to the top central hitch point of the tractor, a transverse pin on said yoke and an adjusting link having its one end connected to said second U-shaped frame and having a plurality of notches spaced along its length, said notches being constructed and arranged for selective engagement with said pin, thereby selectively determining the angular position of said supporting pocket with respect to the tractor.

4. The combination defined in claim 3 wherein said notches have side walls inclined so as to permit disengagement of any selected one of said notches with said pin upon upward movement of said hitch links.

LOREN E. BARTLING.

REFERENCES CITED

The following references are of record in the file of this patent:

UNITED STATES PATENTS

| Number | Name | Date |
| --- | --- | --- |
| 1,470,246 | Willis et al. | Oct. 9, 1923 |
| 1,634,701 | Williams | July 5, 1927 |
| 2,065,268 | Crary | Dec. 22, 1936 |
| 2,314,298 | Welch | Mar. 16, 1943 |
| 2,447,071 | Hauffman | Aug. 17, 1948 |
| 2,464,224 | Grabert | Mar. 15, 1949 |
| 2,548,209 | Foster | Apr. 10, 1951 |

FOREIGN PATENTS

| Number | Country | Date |
| --- | --- | --- |
| 82,509 | Germany | Jan. 25, 1921 |